United States Patent
Tang

(10) Patent No.: US 11,783,137 B2
(45) Date of Patent: Oct. 10, 2023

(54) TRANSLATION METHOD AND TRANSLATION DEVICE

(71) Applicant: Compal Electronics, Inc., Taipei (TW)

(72) Inventor: Dao-Wen Tang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 249 days.

(21) Appl. No.: 17/392,043

(22) Filed: Aug. 2, 2021

(65) Prior Publication Data
US 2022/0382998 A1    Dec. 1, 2022

(30) Foreign Application Priority Data
May 25, 2021    (TW) .................................. 110118893

(51) Int. Cl.
     *G06F 40/58*      (2020.01)
     *G10L 13/047*      (2013.01)
     *G10L 15/26*      (2006.01)

(52) U.S. Cl.
CPC ............ *G06F 40/58* (2020.01); *G10L 13/047* (2013.01); *G10L 15/26* (2013.01)

(58) Field of Classification Search
CPC ................................ G06F 40/40; G06F 40/42
See application file for complete search history.

(56) References Cited

U.S. PATENT DOCUMENTS

| | | | | |
|---|---|---|---|---|
| 2020/0034436 A1* | 1/2020 | Chen | ........................ | G06N 3/08 |
| 2020/0192986 A1* | 6/2020 | Zhang | ..................... | G10L 15/22 |
| 2020/0226327 A1 | 7/2020 | Matusov et al. | | |
| 2020/0342852 A1 | 10/2020 | Kim et al. | | |
| 2021/0034335 A1 | 2/2021 | Svyatkovskiy et al. | | |
| 2021/0042475 A1 | 2/2021 | Zhang et al. | | |

FOREIGN PATENT DOCUMENTS

| | | |
|---|---|---|
| CN | 107145589 A | 9/2017 |
| CN | 109523989 A | 3/2019 |
| CN | 105763424 B | 5/2019 |
| CN | 111369980 A | 7/2020 |

(Continued)

OTHER PUBLICATIONS

Johnson, Melvin, et al. "Google's multilingual neural machine translation system: Enabling zero-shot translation." Transactions of the Association for Computational Linguistics 5 (2017): 339-351. (Year: 2017).*

(Continued)

*Primary Examiner* — Jialong He
(74) *Attorney, Agent, or Firm* — KIRTON McCONKIE; Evan R. Witt

(57) ABSTRACT

A translation method includes steps of providing a translation device, inputting a first conversational voice corresponded to a first language, converting the first conversational voice into a general language content, converting the general language content into a second conversational voice corresponded to a second language, and outputting the second conversational voice. As a result, any language may be translated into a general language, and then translated into any target language, so that the advantages of implementing multi-lingual translations and conversations with simple setting are achieved.

7 Claims, 15 Drawing Sheets

(56) References Cited

FOREIGN PATENT DOCUMENTS

| | | |
|---|---|---|
| JP | 2019211977 A | 12/2019 |
| TW | 200801988 A | 1/2008 |
| TW | 201007483 A | 2/2010 |
| TW | 201020814 A | 6/2010 |
| TW | M565821 U | 8/2018 |
| TW | I685759 B | 2/2020 |

OTHER PUBLICATIONS

Escolano, Carlos, Marta R. Costa-Jussà, and José AR Fonollosa. "From bilingual to multilingual neural-based machine translation by incremental training." Journal of the Association for Information Science and Technology 72.2 (Feb. 2021): 190-203. (Year: 2021).*

Zhu, Changfeng, et al. "Language-aware interlingua for multilingual neural machine translation." Proceedings of the 58th Annual Meeting of the Association for Computational Linguistics. 2020. (Year: 2020).*

Sen, Sukanta, et al. "Multilingual unsupervised NMT using shared encoder and language-specific decoders." Proceedings of the 57th Annual Meeting of the Association for Computational Linguistics. 2019. (Year: 2019).*

Kobayashi Naoki et al., Neural Machine Translation Using Intermediate Expression Constraints for Bidirectional Translation, Proceedings of the 24th Annual Conference of the Association for Natural Language Processing, Mar. 2018, p. 300-303.

* cited by examiner

TRANSLATION METHOD AND TRANSLATION DEVICE

CROSS-REFERENCE TO RELATED APPLICATION

This application claims the priority from Taiwan Patent Application No. 110118893, filed on May 25, 2021, the entire contents of which are incorporated herein by reference for all purposes.

FIELD OF THE INVENTION

The present disclosure relates to a translation method, and more particularly to a translation method and a translation device.

BACKGROUND OF THE INVENTION

For a long time, translation plays an important role in daily life or business occasions. For example, meetings and tourism have translation needs. Although a new language can be learned by people themselves, it is still hard to master multiple languages. Under this circumstance, there will be needs of translations. Assuming non-governmental activities such as traveling, participating in speeches, or multinational company meetings, it is not realistic to have a professional translator accompanied. Therefore, machine translation is often used to meet the demands in the real environment.

Take translation machines on the market as an example. When translating, the language spoken by the user must be selected firstly, and the target language which is going to be translated is then selected. Therefore, especially when there are people from countries using different languages participating in a meeting, the settings of each translation machine have to be continuously changed according to the language of the interlocutor, which is quite inconvenient to use.

Please refer to FIG. 1. FIG. 1 schematically illustrates the implementation of a conventional translation method translating between multiple languages. In the conventional translation method, the translation between different languages is always one-to-one translation. Suppose there are three users who conduct a conversation in Chinese, English and Spanish. The translation machine has to be continuously switched between 6 translators of Chinese-English, English-Chinese, Chinese-Spanish, Spanish-Chinese, English-Spanish, and Spanish-English during the conversation. Most of them require users to operate and switch by themselves. If there are four users who conduct a conversation in Chinese, English, Spanish, and French, the translation machine has to be continuously switched between 12 translators.

In specific, when a Chinese user talks with an English user, a Spanish user, and a French user and says "你好" (i.e., the Chinese "Hello"), "你好" in Chinese has to be correspondingly translated into synonyms such as "Hello" in English, "Hola" in Spanish, and "Bonjour" in French, and the translators of Chinese-English, Chinese-Spanish, and Chinese-French will be necessary. When the English user, the Spanish user, and the French user respond, the translators of each language corresponded to other three languages are needed for the four users using four different languages to understand the conversation between each other. In brief, the more languages to be translated and the more target languages, the more translators must be prepared. It is not only unfavorable for users to operate, but also a huge burden for the resources of the translation machine, such as computing performance, storage space, and memory utilization.

Therefore, there is a need of providing a translation method and a translation device distinct from prior art in order to solve the above drawbacks.

SUMMARY OF THE INVENTION

Some embodiments of the present disclosure are to provide a translation method and a translation device in order to overcome at least one of the above-mentioned drawbacks encountered by prior art.

The present disclosure provides a translation method and a translation device. By converting the first conversational voice corresponded to the first language into the general language content, converting the general language content into the second conversational voice corresponded to the second language, and outputting the second conversational voice, any language may be translated into a general language and then translated into any target language, so that the advantages of implementing multi-lingual translations and conversations with simple setting are achieved.

The present disclosure also provides a translation method and a translation device. Through the common descriptions of general features and general representations of the general language content with regard to a plurality of languages, each translation device only needs a set of an encoder and a decoder corresponded to the language used by the translation device itself to implement multi-lingual translations and conversations when multiple users using different languages have a dialogue with multiple translation devices. Not only the resource consumption can be significantly reduced, but also the memory utilization can be effectively improved.

In accordance with an aspect of the present disclosure, there is provided a translation method. The translation method includes steps of providing a translation device, inputting a first conversational voice corresponded to a first language, converting the first conversational voice into a general language content, converting the general language content into a second conversational voice corresponded to a second language, and outputting the second conversational voice.

In accordance with another aspect of the present disclosure, there is provided a translation method. The translation method includes steps of providing a translation device comprising an encoder and a decoder corresponded to a first language, inputting a first conversational voice corresponded to the first language, allowing the encoder to convert the first conversational voice into a general language output content, allowing the translation device to output the general language output content to an external translation device and receive a general language input content outputted by the external translation device and converted from a second conversational voice corresponded to a second language, allowing the decoder to convert the general language input content into a translation voice corresponded to the first language, and outputting the translation voice.

In accordance with another aspect of the present disclosure, there is provided a translation device. The translation device includes a control unit, a voice input unit, a voice-to-text module, an encoder, a decoder, a text-to-voice module, a voice output unit. The voice input unit is connected with the control unit. A first conversational voice corresponded to a first language is received by the voice input unit. The voice-to-text module is connected with the control unit. The first conversational voice is converted into a first language text by the voice-to-text module. The encoder is connected with the control unit. The first language text is converted into a general language content by the encoder.

The decoder is connected with the control unit. The general language content is converted into a second language text corresponded to a second language by the decoder. The text-to-voice module is connected with the control unit. The second language text is converted into a second conversational voice by the text-to-voice module. The voice output unit is connected with the control unit. The second conversational voice is outputted by the voice output unit.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
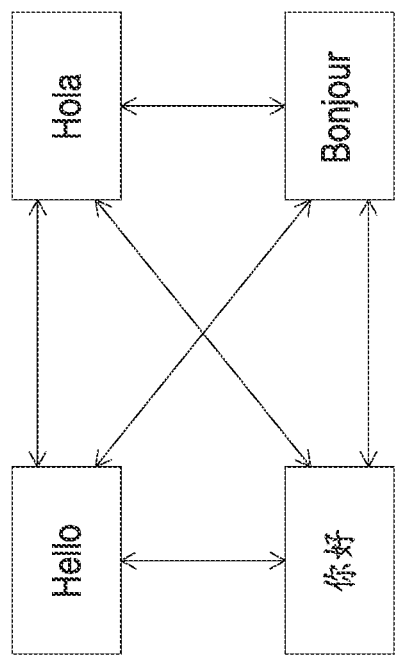
FIG. 1 schematically illustrates the implementation of a conventional translation method translating between multiple languages.
Figure 2:
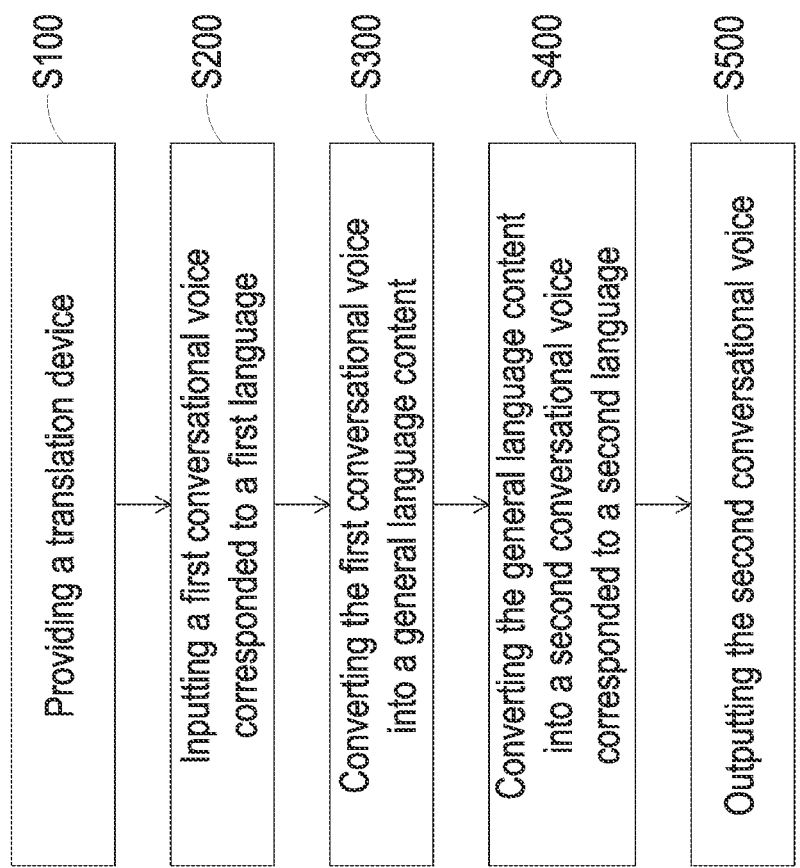
FIG. 2 schematically illustrates the flow chart of a translation method according to an embodiment of the present disclosure.

Please refer to FIG. 2. FIG. 2 schematically illustrates the flow chart of a translation method according to an embodiment of the present disclosure. As shown in FIG. 2, a translation method according to an embodiment of the present disclosure includes steps as following. Firstly, as shown in step S100, a translation device is provided. Next, as shown in step S200, a first conversational voice corresponded to a first language is inputted. In specific, the first conversational voice can be voiced by a user who speaks the first language and received by the translation device. Then, as shown in step S300, the first conversational voice is converted into a general language content. Next, as shown in step S400, the general language content is converted into a second conversational voice corresponded to a second language. Then, as shown in step S500, the second conversational voice is outputted. As a result, any language may be translated into a general language and then translated into any target language, so that the advantages of implementing multi-lingual translations and conversations with simple setting are achieved.

Figure 3:
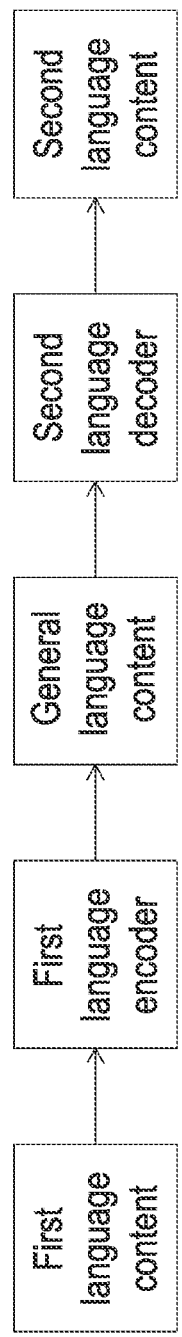
FIG. 3 schematically illustrates the flow block diagram of implementing a translation between two languages with a translation method of the present disclosure.

Please refer to FIG. 3. FIG. 3 schematically illustrates the flow block diagram of implementing a translation between two languages with a translation method of the present disclosure. As shown in FIG. 3, when implementing a translation between two languages, the translation method of the present disclosure converts a first language content, which is for example a first conversational voice corresponded to a first language or a first language text corresponded to the first language, into a general language content with a first language encoder, and then decodes and converts the general language content into a second language content, which is for example a second conversational voice corresponded to a second language or a second language text corresponded to the second language, with a second language decoder.

In this embodiment, the first language and the second language are different languages. The general language content is corresponded to a general mechanical language. The general language content includes a general feature and a general representation, and the general feature includes a plurality of language features of at least the first language and the second language. The general representation is at least partially corresponded to a meaning of the first conversational voice and the second conversational voice, but not limited herein. In addition, the language features include at least one part-of-speech feature, at least one intention feature, at least one verb state feature, and at least one tense feature.

Figure 4:
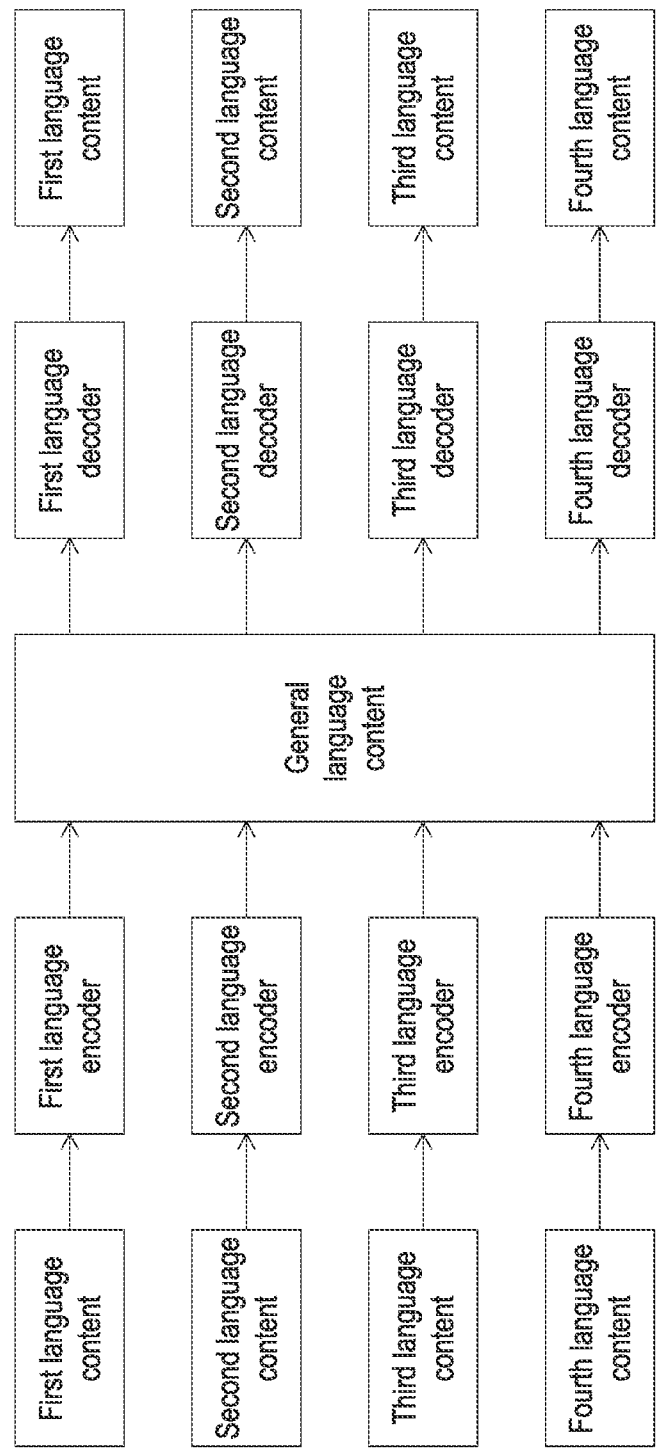
FIG. 4 schematically illustrates the flow block diagram of implementing translations between multiple languages with a translation method of the present disclosure.
Figure 5:
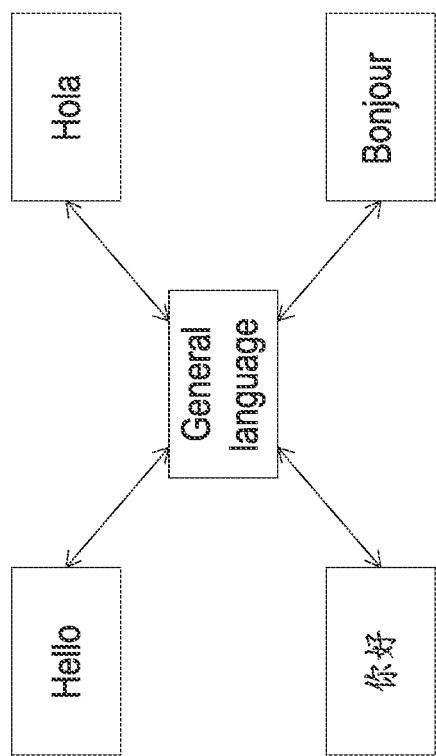
FIG. 5 schematically illustrates the implementation of translating between multiple languages with a translation method of the present disclosure.

Please refer to FIG. 4 and FIG. 5. FIG. 4 schematically illustrates the flow block diagram of implementing translations between multiple languages with a translation method of the present disclosure. FIG. 5 schematically illustrates the implementation of translating between multiple languages with a translation method of the present disclosure. As shown in FIG. 4 and FIG. 5, the translation method of the present disclosure converts a first language content into a general language content through a first language encoder, converts a second language content into the general language content through a second language encoder, converts a third language content into the general language content through a third language encoder, and converts a fourth language content into the general language content through a fourth language encoder when implementing translations between multiple languages.

In some embodiments, the general language content includes a general feature and a general representation, and the general feature includes a plurality of language features of the first language, the second language, the third language, and the fourth language, such as part-of-speech features, intention features, verb state features, and tense features. The general representation is at least partially corresponded to a meaning of the first language content, the second language content, the third language content, and the fourth language content.

When the translation method of the present disclosure converts the general language content into specific languages, such as the first language, the second language, the third language, and the fourth language, the translation method converts the general language content into the first language content through the first language decoder, converts the general language content into the second language content through the second language decoder, converts the general language content into the third language content through the third language decoder, and converts the general language content into the fourth language content through the fourth language decoder.

For example, when implementing translations between Chinese, English, Spanish, and French as shown in FIG. 5, assuming the first language is Chinese, the second language is English, the third language is Spanish, the fourth language is French, and a Chinese content " 你好 " (i.e., the Chinese "Hello") is going to be translated into an English content "Hello", a Spanish content "Hola", and a French content "Bonjour", the translation method of the present disclosure encodes and converts the Chinese content into a general language content, which means that " 你好 " is converted into a general language content including a general feature and a general representation, and then the translation method decodes and converts the general language content into the English content "Hello", the Spanish content "Hola", and the French content "Bonjour" and outputs these contents. In brief, no matter what the corresponded language of a source content is, the translation method of the present disclosure can encode and convert the source content into the general language content, generate a translated language content with a decoder corresponded to a specific language, and output the translated language content. In comparison with prior art, the resource consumption can be effectively reduced and the memory utilization can be improved.

It should be noted that when adding a new language to be translatable to the translation method of the present disclosure, only a set of an encoder and a decoder corresponded to the new language has to be added for encoding and converting a new language content into the general language content and decoding and converting the general language content into the new language content so as to implement translations between the new language and any other languages. Compared with prior art, it is necessary for prior art to prepare a two-way translator for the new language to each language. Not only the preparation is more difficult, but also the requirements of the memory and hardware resources are higher.

Figure 6:
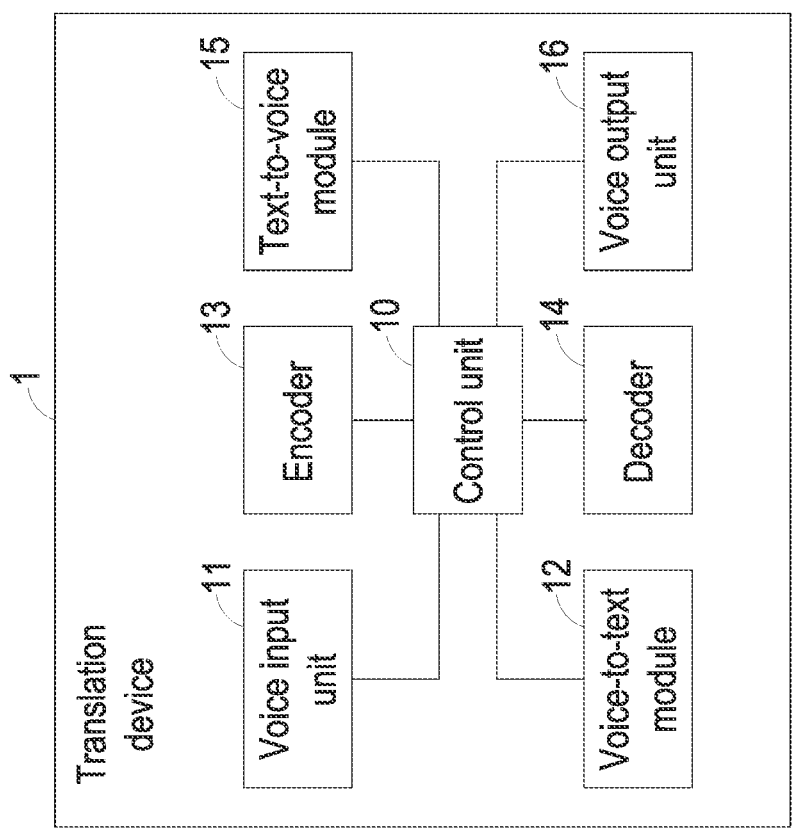
FIG. 6 schematically illustrates the configuration of a translation device according to an embodiment of the present disclosure.
Figure 7:
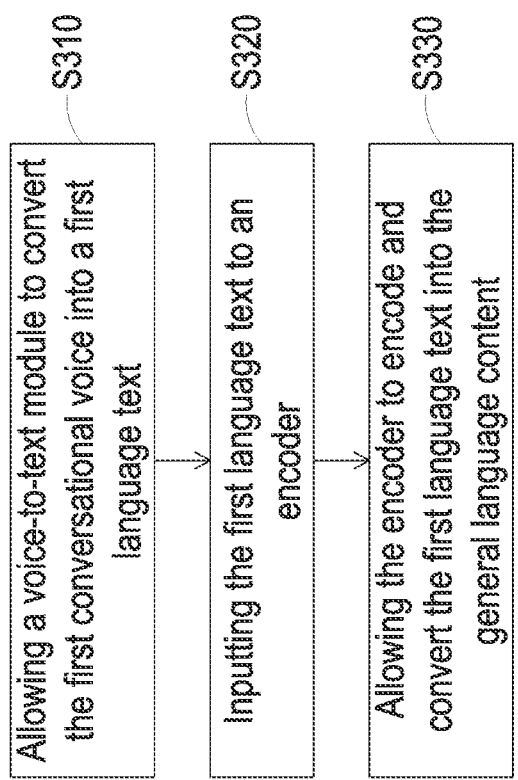
FIG. 7 schematically illustrates the detailed flow chart of the step S300 shown in FIG. 2.
Figure 8:
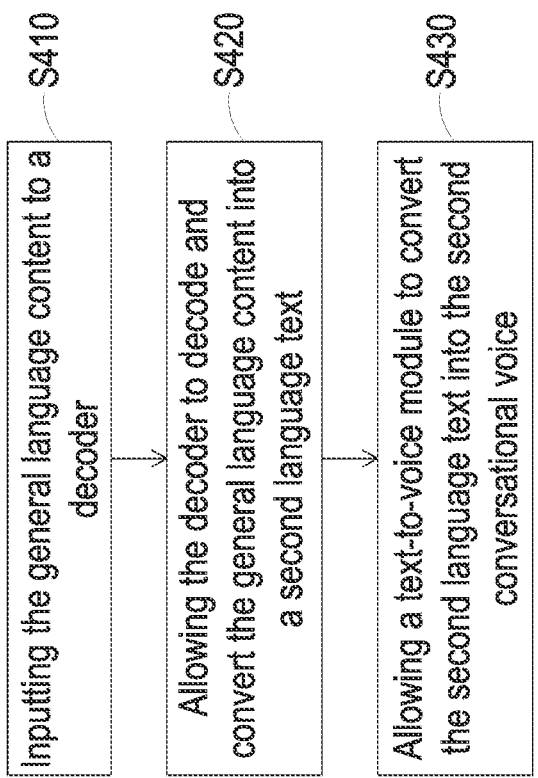
FIG. 8 schematically illustrates the detailed flow chart of the step S400 shown in FIG. 2.

Please refer to FIG. 6, FIG. 7, and FIG. 8. FIG. 6 schematically illustrates the configuration of a translation device according to an embodiment of the present disclosure. FIG. 7 schematically illustrates the detailed flow chart of the step S300 shown in FIG. 2. FIG. 8 schematically illustrates the detailed flow chart of the step S400 shown in FIG. 2. As shown in FIG. 6, FIG. 7, and FIG. 8, the step S300 of the translation method of the present disclosure includes sub-steps S310, S320, and S330, and the step S400 of the translation method of the present disclosure includes sub-steps S410, S420, and S430. The sub-step S310 is a sub-step of allowing a voice-to-text module to convert the first conversational voice into a first language text. The sub-step S320 is a sub-step of inputting the first language text to an encoder. The sub-step S330 is a sub-step of allowing the encoder to encode and convert the first language text into the general language content. The sub-step S410 is a sub-step of inputting the general language content to a decoder. The sub-step S420 is a sub-step of allowing the decoder to decode and convert the general language content into a second language text. The sub-step S430 is a sub-step of allowing a text-to-voice module to convert the second language text into the second conversational voice.

In some embodiments, a translation device 1 of the present disclosure includes a control unit 10, a voice input unit 11, a voice-to-text module 12, an encoder 13, a decoder 14, a text-to-voice module 15, and a voice output unit 16. The voice input unit 11 is connected with the control unit 10. A first conversational voice corresponded to a first language is received by the voice input unit 11. The voice-to-text module 12 is connected with the control unit 10. The first conversational voice is converted into a first language text by the voice-to-text module 12. The encoder 13 is connected with the control unit 10. The first language text is converted into a general language content by the encoder 13. The decoder 14 is connected with the control unit 10. The general language content is converted into a second language text corresponded to a second language by the decoder 14. The text-to-voice module 15 is connected with the control unit 10. The second language text is converted into a second conversational voice by the text-to-voice module 15. The voice output unit 16 is connected with the control unit 10. The second conversational voice is outputted by the voice output unit 16. The voice input unit 11 can be a microphone, the voice-to-text module 12 can be a voice-to-text chip or a voice-to-text software module, the encoder 13 can be a hardware encoder or a software encoder, the decoder 14 can be a hardware decoder or a software decoder, the text-to-voice module 15 can be a text-to-voice chip or a text-to-voice software module, and the voice output unit 16 can be an earphone or a speaker, but not limited herein.

Figure 9:
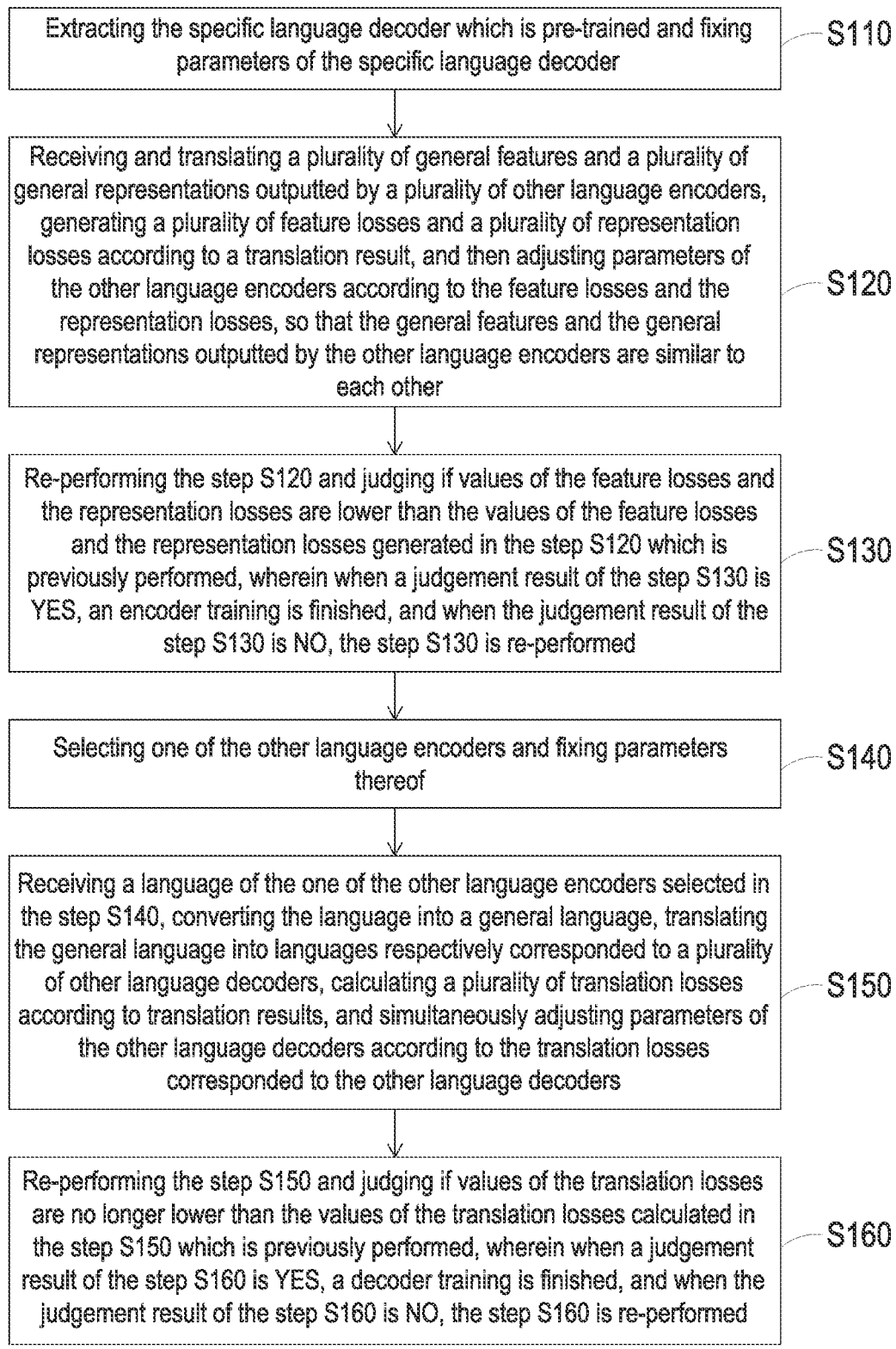
FIG. 9 schematically illustrates the flow chart of partial steps of a translation method according to an embodiment of the present disclosure.
Figure 10:
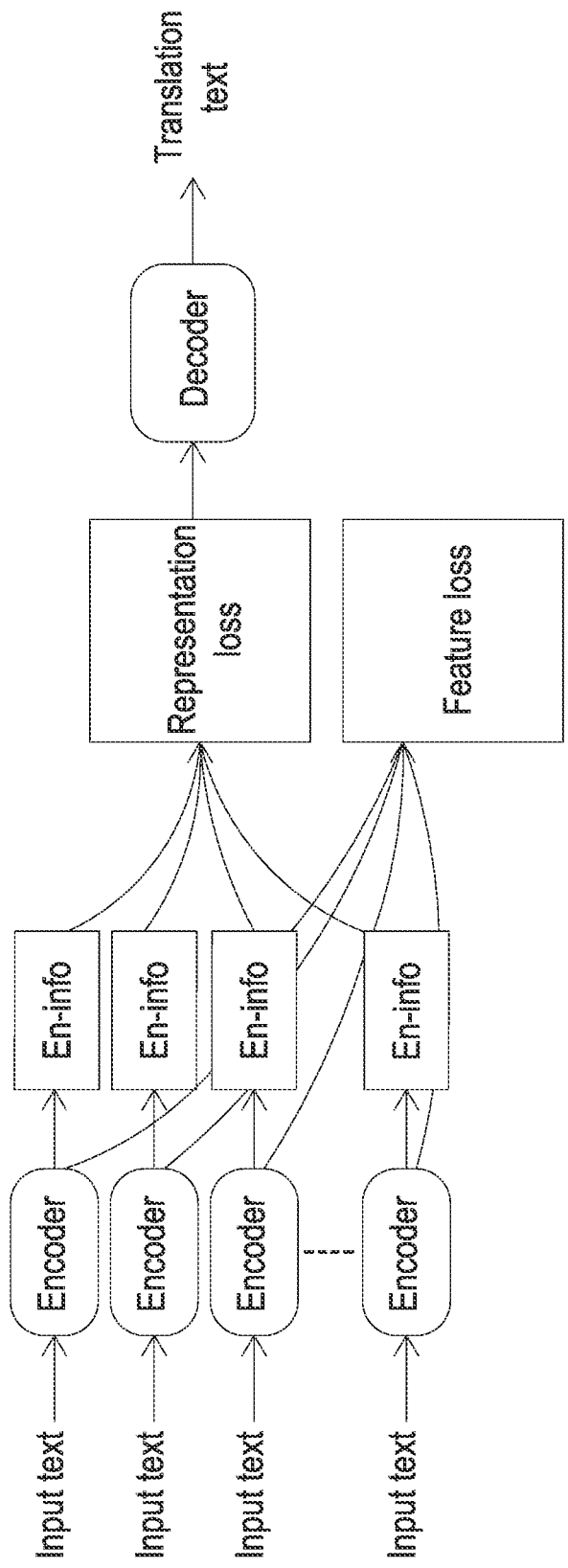
FIG. 10 schematically illustrates the training process of an encoder of a translation method of the present disclosure.
Figure 11:
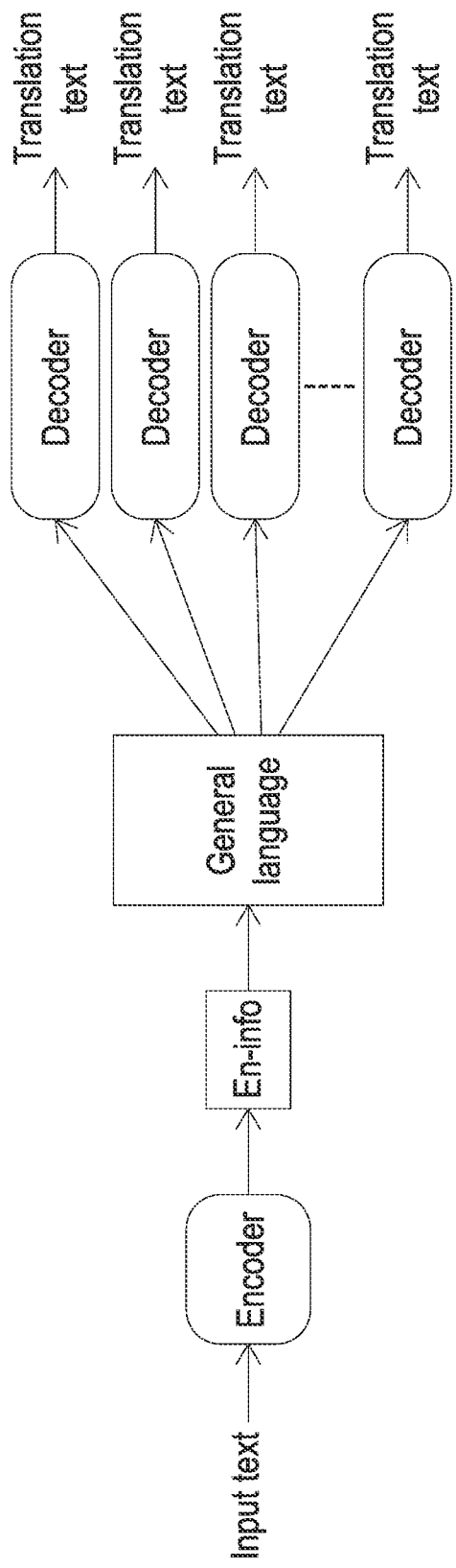
FIG. 11 schematically illustrates the training process of a decoder of a translation method of the present disclosure.
Figure 12:
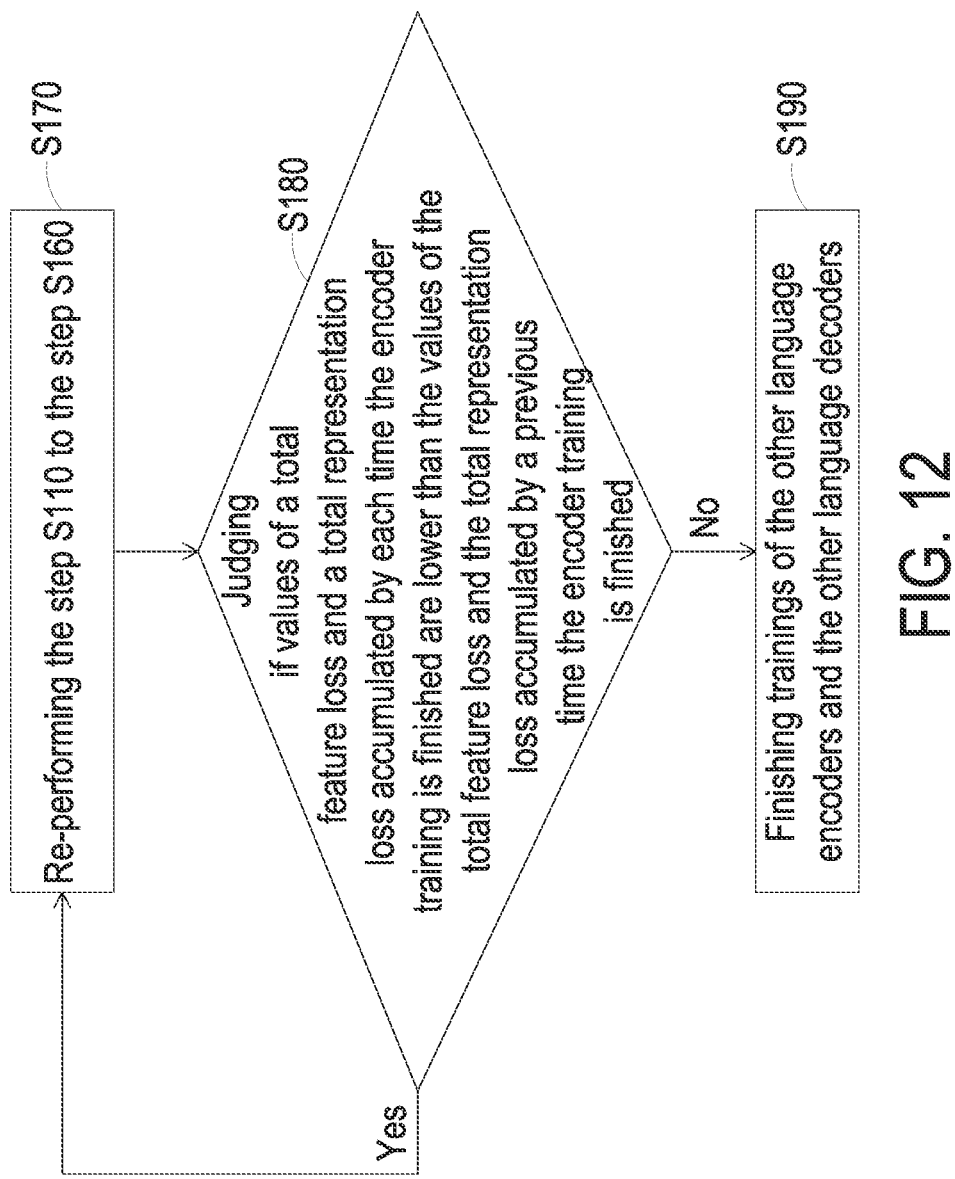
FIG. 12 schematically illustrates the flow chart of partial steps of a translation method according to an embodiment of the present disclosure.

In an embodiment of a translation method of the present disclosure, a translation device includes a specific language encoder and a specific language decoder. The specific language encoder and the specific language decoder are pre-trained specifically by a manner of monitoring machine learning, but not limited herein. Please refer to FIG. 9, FIG. 10, FIG. 11, and FIG. 12. FIG. 9 schematically illustrates the flow chart of partial steps of a translation method according to an embodiment of the present disclosure. FIG. 10 schematically illustrates the training process of an encoder of a translation method of the present disclosure. FIG. 11 schematically illustrates the training process of a decoder of a translation method of the present disclosure. FIG. 12 schematically illustrates the flow chart of partial steps of a translation method according to an embodiment of the present disclosure. As shown in FIGS. 9-12, between the step S100 and the step S200 of FIG. 2, a translation method of the present disclosure further includes steps S110-S160 and steps S170-S190, which are described in detail as following.

If a translation device of a translation method of the present disclosure includes a specific language encoder and a specific language decoder which are pre-trained, an optimization or a deep learning based on generative adversarial networks can be performed between the step S100 and the step S200. In specific, the training process of the translation device in the present disclosure can be generally classified into an encoder training process including steps S110-S130 and a decoder training process including steps S140-S160.

At the beginning of the encoder training, a step of extracting the specific language decoder which is pre-trained and fixing parameters of the specific language decoder is performed as shown in the step S110. Next, as shown in the step S120, receiving and translating a plurality of general features and a plurality of general representations outputted by a plurality of other language encoders, generating a plurality of feature losses and a plurality of representation losses according to a translation result, and then adjusting parameters of the other language encoders according to the feature losses and the representation losses, so that the general features and the general representations outputted by the other language encoders are similar to each other. It should be noted that the feature losses and the representation losses represent the degree of loss during translation, so the smaller the feature losses and the representation losses, the better. Then, as shown in the step S130, re-performing the step S120 and judging if values of the feature losses and the representation losses are lower than the values of the feature losses and the representation losses generated in the step S120 which is previously performed. When a judgement result of the step S130 is YES, the encoder training is finished, and when the judgement result of the step S130 is NO, the step S130 is re-performed. In some embodiments, the method of specifically implementing the encoder training described above is shown in FIG. 10. The input text is translated by each encoder separately, and the translation text is outputted by the decoder when the feature losses and the representation losses are no longer decreased. Next, as shown in step S140, selecting one of the other language encoders and fixing parameters thereof. Then, as shown in step S150, receiving a language of the one of the other language encoders selected in the step S140, converting the language into a general language, translating the general language into languages respectively corresponded to a plurality of other language decoders, calculating a plurality of translation losses according to translation results, and simultaneously adjusting parameters of the other language decoders according to the translation losses corresponded to the other language decoders. Certainly, the general language can be directly translated into the translation text of each language through each decoder and then outputted as shown in FIG. 11, but not limited herein. Next, as shown in step S160, re-performing the step S150 and judging if values of the translation losses are no longer lower than the values of the translation losses calculated in the step S150 which is previously performed. When a judgement result of the step S160 is YES, a decoder training is finished, and when the judgement result of the step S160 is NO, the step S160 is re-performed.

In step S170, the step S110 to the step S160 are re-performed, so that the other language encoders are gradually adjusted to be consistent, and a decoder that can receive input in various languages and correspond to a specific language can be trained. Next, as shown in step S180, it is judged if values of a total feature loss and a total representation loss accumulated by each time the encoder training is finished are lower than the values of the total feature loss and the total representation loss accumulated by a previous time the encoder training is finished. When a judgement result of the step S180 is YES, the step S170 is re-performed after the step S180, which means that the step S110 to the step S160 are re-performed after the step S180, and when the judgement result of the step S180 is NO, a step S190 of finishing trainings of the other language encoders and the other language decoders is performed after the step S180. In other words, when the translation method of the present disclosure minimizes the translation losses between the plurality of other language encoders and the plurality of other language decoders, the training of each of the plurality of other language encoders and each of the plurality of other language decoders is completed.

Figure 13:
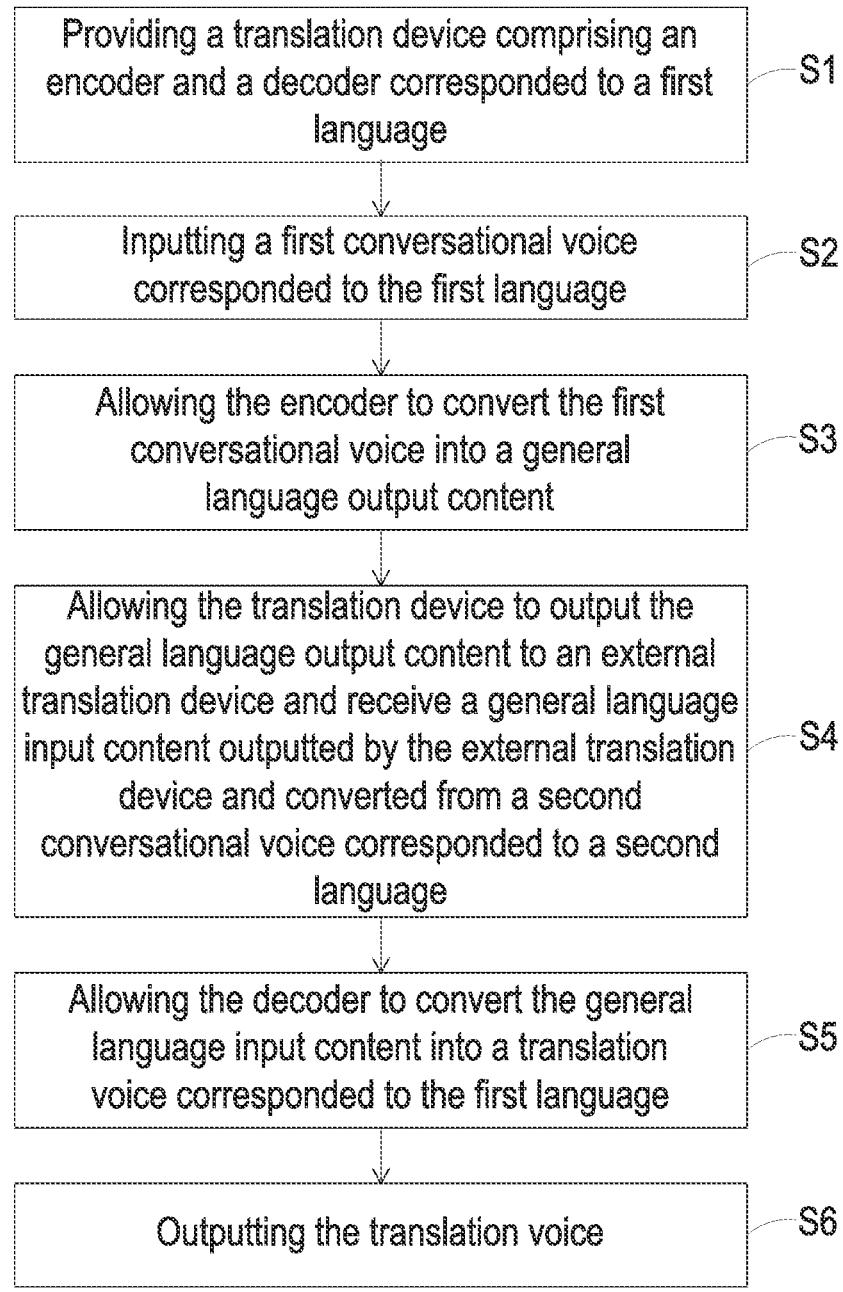
FIG. 13 schematically illustrates the flow chart of a translation method according to an embodiment of the present disclosure.
Figure 14:
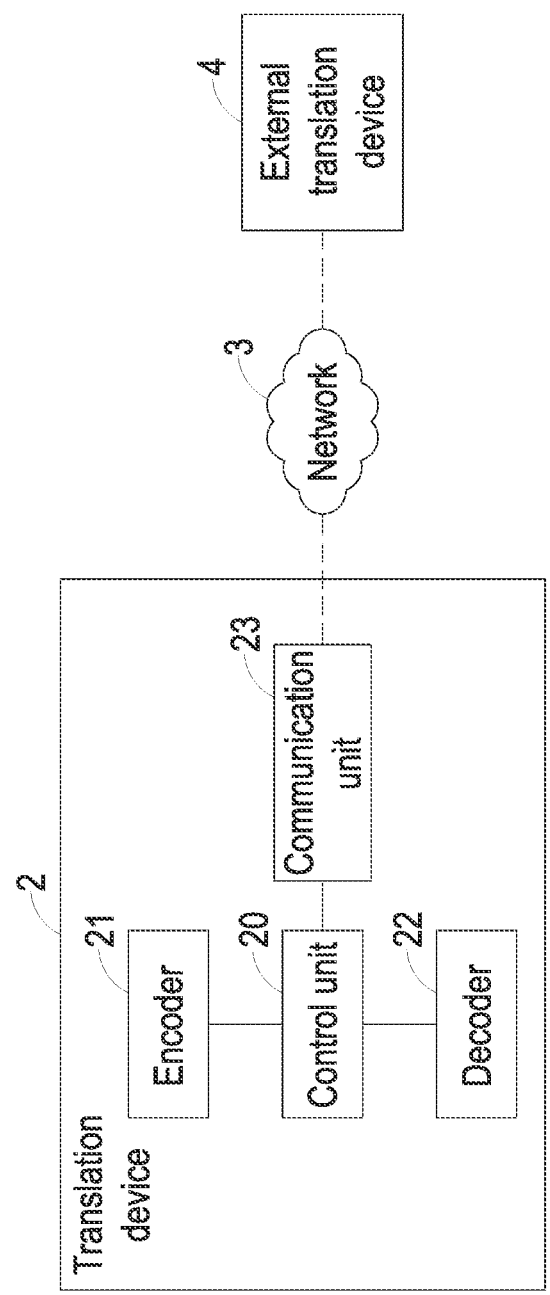
FIG. 14 schematically illustrates the configuration of a translation device of a translation method according to an embodiment of the present disclosure.

The following embodiment describes that a user utilizes a translation device provided by a translation method of the present disclosure to have a conversation with other users utilizing the same translation devices. Please refer to FIG. 13 and FIG. 14. FIG. 13 schematically illustrates the flow chart of a translation method according to an embodiment of the present disclosure. FIG. 14 schematically illustrates the configuration of a translation device of a translation method according to an embodiment of the present disclosure. In an embodiment, a translation method of the present disclosure includes steps as following. Firstly, as shown in step S1, a translation device 2 including an encoder 21 and a decoder 22 corresponded to a first language is provided. The encoder 21 and the decoder 22 are preferably connected with a control unit 20, but not limited herein. The encoder 21 and the decoder 22 are the encoder and the decoder corresponded to the specific language mainly used by the user of the translation device. In this embodiment, the specific language is the first language. Next, as shown in step S2, a first conversational voice corresponded to the first language is inputted. For example, the user speaks a specific sentence in the first language. Next, as shown in step S3, the encoder 21 converts the first conversational voice into a general language output content. Then, as shown in step S4, the translation device 2 outputs the general language output content, for example through a communication unit 23 and a network 24, to an external translation device 4 and receives a general language input content outputted by the external translation device 4 and converted from a second conversational voice corresponded to a second language. Next, as shown in step S5, the decoder 21 converts the general language input content into a translation voice corresponded to the first language. Then, as shown in step S6, the translation voice is outputted. In this embodiment, the user only has to select a set of an encoder 21 and a decoder 22 for outputting a conversational voice voiced by the user as a general language output content to an external translation device 4 through a translation device 2, translating the general language input content outputted by the external translation device 4 utilized by each user using each language into a translation voice in a selected language selected by the user, and outputting the translation voice.

Figure 15:
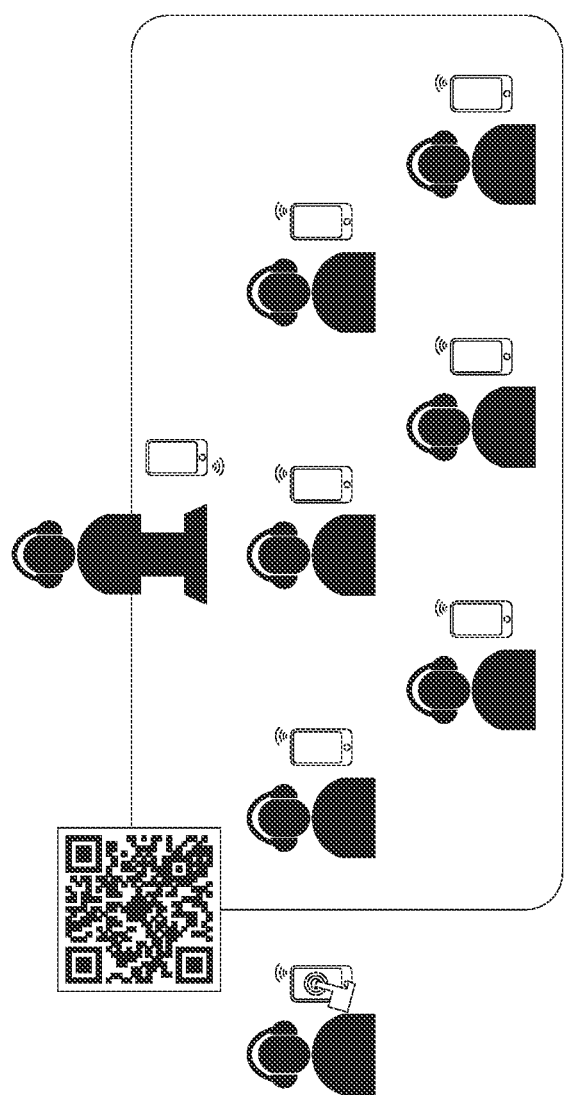
FIG. 15 schematically illustrates the implementation of multi-lingual translations and conversations in a virtual dialogue room with multiple translation devices of the present disclosure used by multiple users.

Please refer to FIG. 15. FIG. 15 schematically illustrates the implementation of multi-lingual translations and conversations in a virtual dialogue room with multiple translation devices of the present disclosure used by multiple users. In some embodiments, the translation method and the translation device of the present disclosure can be cooperated with an application software, such as a virtual dialogue room application software. Multiple users can join the virtual dialogue room by scanning a QR code. The main function of the virtual dialogue room is to transmit general language output contents and general language input contents among multiple users. Users only have to select the encoder and decoder corresponding to their own language as described in the previous paragraph for implementing real-time translation and conversation with users of various languages.

Compared with prior art, the computing and the memory use are significantly improved by the present disclosure.

Please refer to FIG. 13 and FIG. 15 again. For example, when a user speaking Chinese enters a virtual dialogue room with a translation device of the present disclosure as shown in the step S1 and starts conversations with other users using different languages, the user inputs a first conversational voice corresponded to a first language as shown in the 你好 step S2, such as saying "你好" in Chinese. Next, as shown in the step S3, the encoder of the translation device converts "你好" as a general language output content. Then, as shown in the step S4, the translation device outputs the general language output content to an external translation device and receives a general language input content outputted by the external translation device and converted from a second conversational voice corresponded to a second language, such as the general language input content converted from "hello" said by a user speaking English, "Hola" said by a user speaking Spanish, or "Bonjour" said by a user speaking French. Next, as shown in the step S5, the decoder converts the general language input content into a translation voice corresponded to the first language, which is for example a translation voice of "你好" in Chinese. Finally, as shown in the step S6, outputting the translation voice "你好" to the user speaking Chinese through an earphone or a speaker. For users speaking other languages, the translation device and the translation method of the present disclosure can also be used to implement instant and rapid translation and instant conversation with similar steps.

From the above description, the present disclosure provides a translation method and a translation device. By converting the first conversational voice corresponded to the first language into the general language content, converting the general language content into the second conversational voice corresponded to the second language, and outputting the second conversational voice, any language may be translated into a general language and then translated into any target language, so that the advantages of implementing multi-lingual translations and conversations with simple setting are achieved. Meanwhile, through the common descriptions of general features and general representations of the general language content with regard to a plurality of languages, each translation device only needs a set of an encoder and a decoder corresponded to the language used by the translation device itself to implement multi-lingual translations and conversations when multiple users using different languages have a dialogue with multiple translation devices. Not only the resource consumption can be significantly reduced, but also the memory utilization can be effectively improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A translation method, comprising steps of:
  (a) providing a translation device;
  (b) inputting a first conversational voice corresponded to a first language;
  (c) converting the first conversational voice into a general language content;
  (d) converting the general language content into a second conversational voice corresponded to a second language; and
  (e) outputting the second conversational voice,
  wherein the translation device comprises a specific language encoder and a specific language decoder, and the specific language encoder and the specific language decoder are pre-trained, and the translation device is trained by steps of:
  (a1) extracting the specific language decoder which is pre-trained and fixing parameters of the specific language decoder;
  (a2) receiving and translating a plurality of general features and a plurality of general representations outputted by a plurality of other language encoders, generating a plurality of feature losses and a plurality of representation losses according to a translation result, and then adjusting parameters of the other language encoders according to the feature losses and the representation losses, so that the general features and the general representations outputted by the other language encoders are similar to each other;
  (a3) re-performing the step (a2) and judging if values of the feature losses and the representation losses are lower than the values of the feature losses and the representation losses generated in the step (a2) which is previously performed, wherein when a judgment result of the step (a3) is YES, an encoder training is finished, and when the judgement result of the step (a3) is NO, the step (a3) is re-performed;
  (a4) selecting one of the other language encoders and fixing parameters thereof;
  (a5) receiving a language of the one of the other language encoders selected in the step (a4), converting the language into a general language, translating the general language into languages respectively corresponded to a plurality of other language decoders, calculating a plurality of translation losses according to translation results, and simultaneously adjusting parameters of the other language decoders according to the translation losses corresponded to the other language decoders;
  (a6) re-performing, the step (a5) and judging if values of the translation losses are no longer lower than the values of the translation losses calculated in the step (a5) which is previously performed, wherein when a judgement result of the step (a6) is YES, a decoder training is finished, and when the judgement result of the step (6) is NO, the step (a6) is re-performed;
  (a7) re-performing the step (a1) to the step (a6);
  (a8) judging if values of a total feature loss and a total representation loss accumulated by each time the encoder training is finished are lower than the values of the total feature loss and the total representation loss accumulated by a previous time the encoder training is finished; and
  (a9) finishing training of the other language encoders and the other language decoders,
  wherein when a judgement result of the step (a8) is YES, the step (a7) is re-performed after the step (a8), and when the judgement result of the step (a8) is NO, the step (a9) is performed after the step (a8).

2. The translation method according to claim 1, wherein the step (c) comprises sub-steps of:
  (c1) allowing a voice-to-text module to convert the first conversational voice into a first language text;
  (c2) inputting the first language text to an encoder; and (c3) allowing the encoder to encode and convert the first language text into the general language content.

3. The translation method according to claim 2, wherein the step (d) comprises sub-steps of:
(d1) inputting the general language content to a decoder;
(d2) allowing the decoder to decode and convert the general language content into a second language text; and
(d3) allowing a text-to-voice module to convert the second language text into the second conversational voice.

4. The translation method according to claim 1, wherein the first language and the second language are different languages, wherein the general language content is corresponded to a general mechanical language, wherein the general language content comprises a general feature and a general representation, and the general feature comprises a plurality of language features of at least the first language and the second language, and wherein the general representation is at least partially corresponded to a meaning of the first conversational voice and the second conversational voice.

5. The translation method according to claim 4, wherein the language features comprise at least one part-of-speech feature, at least one intention feature, at least one verb state feature, and at least one tense feature.

6. A translation method, comprising steps of:
(a) providing a translation device, wherein the translation device comprises an encoder and a decoder corresponded to a first language;
(b) inputting a first conversational voice corresponded to the first language;
(c) allowing the encoder to convert the first conversational voice into a general language output content;
(d) allowing the translation device to output the general language output content to an external translation device and receive a general language input content outputted by the external translation device and converted from a second conversational voice corresponded to a second language;
(e) allowing the decoder to convert the general language input content into a translation voice corresponded to the first language; and
(f) outputting the translation voice,
wherein at least one of the translation device and the external translation device comprises a specific language encoder and a specific language decoder, and the specific language encoder and the specific language decoder are pre-trained, and at least one of the translation device and the external translation device is trained by steps of:
(a1) extracting the specific language decoder which is pre-trained and fixing parameters of the specific language decoder;
(a2) receiving and translating a plurality of general features and a plurality of general representations outputted by a plurality of other language encoders, generating a plurality of feature losses and a plurality of representation losses according to a translation result, and then adjusting parameters of the other language encoders according to the feature losses and the representation losses, that the general features and the general representation outputted by the other language encoders are similar to each other;
(a3) re-performing the step (a2) and judging if values of the feature losses and the representation losses are lower than the values of the feature losses and the representation losses generated in the step (a2) which is previously performed, wherein when a judgement result of the step (a3) is YES, an encoder training is finished, and when the judgement result of the step (a3) is NO, the step (a3) is re-performed;
(a4) selecting one of the other language encoders and fixing parameters thereof,
(a5) receiving a language of the one of the other language encoders selected in the step (a4), converting the language into a general language, translating the general language into languages respectively corresponded to a plurality of other language decoders, calculating a plurality of translation losses according to translation results, and simultaneously adjusting parameters of the other language decoders according to the translation losses corresponded to the other language decoders;
(a6) re-performing the step (a5) and judging if values of the translation losses are no longer lower than the values of the translation losses calculated in the step (a5) which is previously performed, wherein when a judgement result of the step (a6) is YES, a decoder training is finished, and when the judgement result of the step (a6) is NO, the step (a6) is re-performed;
(a7) re-performing the step (a1) to the step (a6);
(a8) judging if values of a total feature loss and a total representation loss accumulated by each time the encoder training is finished are lower than the values of the total feature loss and the total representation loss accumulated by a previous time the encoder training is finished; and
(a9) finishing trainings of the other language encoders and the other language decoders,
wherein when a judgement result of the step (a8) is YES, the step (a7) is re-performed after the step (a8), and when the judgement result of the step (a8 is NO, the step (a9) is performed after the step (A8.

7. A translation device, comprising:
a controller;
a voice input unit comprising a microphone and connected with the controller, wherein a first conversational voice corresponded to a first language is received by the voice input unit;
a voice-to-text module comprising a voice-to-text chip or a voice-to-text software and connected with the controller, wherein the first conversational voice is converted into a first language text by the voice-to-text module;
an encoder connected with the controller, wherein the first language text is converted into a general language content by the encoder;
a decoder connected with the controller, wherein the general language content is converted into a second language text corresponded to a second language by the decoder;
a text-to-voice module comprising a text-to-voice chip or a text-to-voice software and connected with the controller, wherein the second language text is converted into a second conversational voice by the text-to-voice module; and
a voice output unit comprising an earphone or a speaker and connected with the controller, wherein the second conversational voice is outputted by the voice output unit,
wherein the translation device comprises a specific language encoder and a specific language decoder, and the specific language encoder and the specific language decoder are pre-trained, and the translation device is trained by steps of:

(a1) extracting the specific language decoder which is pre-trained and fixing parameters of the specific language decoder;

(a2) receiving and translating a plurality of general features and a plurality of general representations outputted by a plurality of other language encoders, generating a plurality of feature losses and a plurality of representation losses according to a translation result, and then adjusting parameters of the other language encoders according to the feature losses and the representation losses, so that the general features and the general representations outputted by the other language encoders are similar to each other;

(a3) re-performing the step (a2) and judging if values of the feature losses and the representation losses are lower than the values of the feature losses and the representation losses generated in the step (a2) which is previously performed, wherein when a judgement result of the step (a3) is YES, an encoder training is finished, and when the judgement result of the step (a3) is NO, the step (a3) is re-performed;

(a4) selecting one of the other language encoders and fixing parameters thereof;

(a5) receiving a language of the one of the other language encoders selected in the step (a4), converting the language into a general language, translating the general language into languages respectively corresponded to a plurality of other language decoders, calculating a plurality of translation losses according to translation results, and simultaneously adjusting parameters of the other language decoders according to the translation losses corresponded to the other language decoders;

(a6) re-performing the step (a5) and judging if values of the translation losses are no longer lower than the values of the translation losses calculated in the step (a5) which is previously performed, wherein when a judgement result of the step (a6) is YES, a decoder training is finished, and when the judgement result of the step (a6) is NO, the step (a6) is re-performed;

(a7) re-performing the step (a1) to the step (a6);

(a8 judging if values of a total feature loss and a total representation loss accumulated by each time the encoder training is finished are lower than the values of the total feature loss and the total representation loss accumulated by a previous time the encoder training is finished; and (a9) finishing trainings of the other language encoders and the other language decoders, wherein when a judgement result of the step (a8, is YES, the step (a7 is re-performed after the step (a8), and when the judgement result of the step (a8) is NO, the step (a9) is performed after the step (a8).

* * * * *